US012800764B2

(12) United States Patent
Zhang et al.

(10) Patent No.: US 12,800,764 B2
(45) Date of Patent: Nov. 17, 2026

(54) PHOTOELECTRIC SENSING ACQUISITION MODULE PHOTOELECTRIC SENSING RANGING METHOD AND RANGING DEVICE

(71) Applicant: SHENZHEN ADAPS PHOTONICS TECHNOLOGY CO., LTD., Shenzhen (CN)

(72) Inventors: Chao Zhang, Shenzhen (CN); Kai Zang, Shenzhen (CN); Zhijie Ma, Shenzhen (CN)

(73) Assignee: SHENZHEN ADAPS PHOTONICS TECHNOLOGY CO., LTD., Shenzhen (CN)

(*) Notice: Subject to any disclaimer, the term of this patent is extended or adjusted under 35 U.S.C. 154(b) by 1056 days.

(21) Appl. No.: 18/048,765

(22) Filed: Oct. 21, 2022

(65) Prior Publication Data

US 2023/0084331 A1 Mar. 16, 2023

Related U.S. Application Data

(63) Continuation of application No. PCT/CN2021/088723, filed on Apr. 21, 2021.

(30) Foreign Application Priority Data

Apr. 22, 2020 (CN) ......................... 202010323717.5

(51) Int. Cl.
*G01S 17/00* (2020.01)
*G01S 7/481* (2006.01)
*G01S 17/10* (2020.01)

(52) U.S. Cl.
CPC ........... *G01S 17/10* (2013.01); *G01S 7/4816* (2013.01)

(58) Field of Classification Search
USPC ........................................................ 356/4.01
See application file for complete search history.

(56) References Cited

U.S. PATENT DOCUMENTS 4,602,243 A 7/1986 Von Bargen et al.
10,948,575 B2* 3/2021 Kienzler ............... G01S 7/4863
(Continued)

FOREIGN PATENT DOCUMENTS

CN 106527099 A 3/2017
CN 106681126 A 5/2017
(Continued)

OTHER PUBLICATIONS

International Search Report and Written Opinion dated Jul. 7, 2021 for International Application No. PCT/CN2021/088723.
(Continued)

*Primary Examiner* — James R Hulka

(57) ABSTRACT

One general aspect of the invention includes an apparatus for range determination. The apparatus includes a signal transmitter configured to emit an optical signal a first time. The apparatus also includes a first light transmitting unit configured to direct the optical signal to a target. The apparatus also includes a second light transmitting unit configured to receive a reflected optical signal at a second time, the reflected optical signal being associated with the optical signal and the target. The apparatus also includes a first photoelectric receiver configured to convert a first portion of the reflected optical signal to a first electrical signal. The apparatus also includes a first pulse converter configured to generate a first pulse using the first electrical signal. The apparatus also includes a first time to digital converter (TDC) configured to generate a first TDC output using at least the first electrical signal.

17 Claims, 11 Drawing Sheets

(56) References Cited

U.S. PATENT DOCUMENTS

| | | | | |
|---|---|---|---|---|
| 12,203,807 | B2 * | 1/2025 | Nishino | G01S 17/931 |
| 2003/0035097 | A1 | 2/2003 | Lai et al. | |
| 2003/0137647 | A1 | 7/2003 | Hasson et al. | |
| 2008/0144000 | A1 | 6/2008 | Thun et al. | |
| 2015/0281618 | A1 * | 10/2015 | Saito | G01S 17/894 348/303 |
| 2016/0349368 | A1 | 12/2016 | Stutz et al. | |
| 2018/0188373 | A1 * | 7/2018 | Yokota | G01S 7/483 |
| 2018/0372849 | A1 * | 12/2018 | Kienzler | G01S 17/10 |
| 2021/0325244 | A1 * | 10/2021 | Nishino | H04N 25/76 |
| 2022/0299613 | A1 * | 9/2022 | Zhang | G01S 17/93 |

FOREIGN PATENT DOCUMENTS

| | | | |
|---|---|---|---|
| CN | 108287346 | A | 7/2018 |
| CN | 108897331 | A | 11/2018 |
| CN | 109100737 | A | 12/2018 |
| CN | 110646806 | A | 1/2020 |
| CN | 110954918 | A | 4/2020 |
| CN | 111337937 | A | 6/2020 |
| CN | 212808625 | U | 3/2021 |
| DE | 10 2011 056 963 | B3 | 9/2012 |
| JP | H8-220231 | A | 8/1996 |
| JP | 2020034522 | A | 3/2020 |
| WO | 2013/053355 | A1 | 4/2013 |

OTHER PUBLICATIONS

First Office Action for Chinese Patent Application No. 202010323717.5, dated May 8, 2024.

* cited by examiner

PHOTOELECTRIC SENSING ACQUISITION MODULE PHOTOELECTRIC SENSING RANGING METHOD AND RANGING DEVICE

CROSS-REFERENCES TO RELATED APPLICATIONS

The present application is a continuation application to PCT Patent Application No. PCT/CN2021/088723, entitled "PHOTOELECTRIC SENSING ACQUISITION MODULE PHOTOELECTRIC SENSING RANGING METHOD AND RANGING DEVICE", filed on Apr. 21, 2021, which claims priority to Chinese Patent invention No. CN202010323717.5, filed on Apr. 22, 2020, and both applications are commonly owned and incorporated by reference herein for all purposes.

BACKGROUND OF THE INVENTION

With the development and progress of science and technology, the time of flight (ToF) principle can be used by lidar to achieve non-contact accurate ranging. The optical signal emitted by the laser light source is reflected by the measured object and received by the photoelectric sensor. The distance of the measured object can be accurately calculated by detecting the flight (return) time of the optical signal. Over the past, various conventional solutions have been proposed, but they are inadequate for the reasons explained below.

Therefore, new and improved systems and methods are desired.

BRIEF SUMMARY OF THE INVENTION

To solve the above problems, embodiments of the invention provide a photoelectric sensing acquisition module with high accuracy, a photoelectric sensing ranging method, and a ranging device.

One general aspect of the invention includes an apparatus for range determination. The apparatus includes a signal transmitter configured to emit an optical signal at a first time. The apparatus also includes a first light transmitting unit configured to direct the optical signal to a target. The apparatus also includes a second light transmitting unit configured to receive a reflected optical signal at a second time, the reflected optical signal being associated with the optical signal and the target. The apparatus also includes a first photoelectric receiver configured to convert a first portion of the reflected optical signal to a first electrical signal. The apparatus also includes a first pulse converter configured to generate a first pulse using the first electrical signal. The apparatus also includes a first time to digital converter (TDC) configured to generate a first TDC output using at least the first electrical signal. The apparatus also includes a first signal accumulator configured to generate a first accumulator output using the at least first electrical signal. The apparatus also includes a data processor configured to calculate a difference between the first time and the second time using the first TDC output and/or the first accumulator output. Other embodiments of this aspect include corresponding computer systems, apparatus, and computer programs recorded on one or more computer storage devices, each configured to perform the actions of the methods.

Implementations may include one or more of the following features. The apparatus where the first signal accumulator may include a digital accumulator and sampler. The optical signal may include a laser pulse. The first photoelectric receiver may include a plurality of single-photon avalanche diodes (SPADs). The first TDC is configured to generate a histogram using outputs of the plurality of SPADs. The plurality of SPADs is coupled to one or more or gates. The first signal accumulator is coupled to outputs of the plurality of SPADs. The outputs of the SPADs are coupled to a first accumulator subunit at a first level. The first accumulator subunit is coupled to a second accumulator subunit at a second level. The first photoelectric receiver may include one or more silicon photomultipliers. The apparatus may include a plurality of photoelectric sensing acquisition modules, the plurality of photoelectric sensing acquisition modules may include a first photoelectric sensing acquisition module, the first photoelectric sensing acquisition module may include the first photoelectric receiver and the first pulse converter. Implementations of the described techniques may include hardware, a method or process, or computer software on a computer-accessible medium.

One general aspect includes a photoelectric sensor acquisition module. The photoelectric sensor acquisition module includes a photoelectric receiving module may include a plurality of photoelectric sensing units arranged in a matrix, the photoelectric sensing units being configured to convert a received optical signal into a digital pulse signal, where the received optical signal may include a light reflected from a target object to the photoelectric receiving module. The module also includes a signal accumulation module electrically connected to the photoelectric receiving module, the signal accumulation module being configured to accumulate the digital pulse signal to obtain an accumulation signal and to sample the accumulation signal according to a sampling signal to obtain a digital accumulation signal, the digital accumulation signal representing the first position range of the target object. The module also includes a pulse conversion module coupled to the photoelectric receiving module through the pulse conversion module, the pulse conversion module being configured to adjust a pulse width of the digital pulse signal received from the photoelectric receiving module, where the signal accumulation module accumulates the pulse signal after adjusting the pulse width and obtains the accumulation signal. Other embodiments of this aspect include corresponding computer systems, apparatus, and computer programs recorded on one or more computer storage devices, each configured to perform the actions of the methods.

Implementations may include one or more of the following features. The module may include: a time digital conversion module electrically coupled to the signal output terminal, the time digital conversion module being configured to measure a time interval between a light signal emitted by the signal transmitting module and the light signal received by the photoelectric receiving module, the time digital conversion module being further configured to obtain a time digital signal according to the time interval characterizing a distance of the target object, the time digital conversion module further configured to determine the first position of the target object within the first position range according to the distance of the target object; and an or-gate module electrically coupled to the pulse conversion module and the time digital conversion module being configured to transmit a converted pulse signal to the time digital conversion module when any photoelectric sensing unit of the photoelectric receiving module receives the optical signal. The or-gate module may include at least a first level or-gate subunit; the first level or-gate subunit may include a plurality of or-gate input terminals and an or-gate output terminal; a total number of the first level or-gate input terminals is the same as a number of the photoelectric sensing units; the first level or-gate input terminal is electrically connected to at least one pulse conversion module; and the or-gate output terminal is coupled to the time digital conversion module. Implementations of the described techniques may include hardware, a method or process, or computer software on a computer-accessible medium.

One general aspect includes a photoelectric sensing ranging method. The method includes accumulating received pulse signals to obtain an accumulation signal. The method also includes sampling the accumulation signal according to the sampling signal to obtain a digital accumulation signal, the digital accumulation signal being associated with a first position range of a target object. The method also includes detecting a time interval between an emitted light signal and the photoelectric receiving module receiving a light signal. The method also includes obtaining a time digital signal according to the time interval to characterize the distance of the target object. The method also includes determining a first position of the target object within the first position range according to the distance of the target object. Other embodiments of this aspect include corresponding computer systems, apparatus, and computer programs recorded on one or more computer storage devices, each configured to perform the actions of the methods.

Implementations may include one or more of the following features. The method where the first position range for determining the target object according to the digital accumulation signal may include: converting an optical signal to a received pulse signal, accumulating the received digital pulse signals to obtain accumulating signals varying with the intensity of the optical signals, sampling the accumulated signal to obtain a first histogram, and analyzing the first histogram to determine the first position range. The method further may include: receiving optical signals repeatedly, converting the optical signals into digital pulse signals, accumulating the received digital pulse signals to obtain the accumulating signal varying with the intensity of the optical signals, sampling the accumulated signal according to the sampling signal to obtain n signal intensity distribution diagrams, accumulating the n signal intensity distribution diagrams and obtaining the target signal intensity distribution diagram, and analyzing the target signal intensity distribution diagram to determine the first position range. At least one level of signal sampling is performed for the accumulated pulse signal, and the digital accumulation signals with different signal intensity values are obtained. Implementations of the described techniques may include hardware, a method or process, or computer software on a computer-accessible medium.

In an embodiment, the present invention provides a photoelectric sensing acquisition module, which comprises a photoelectric receiving module and a signal accumulation module. The photoelectric receiving module comprises a plurality of photoelectric sensing units arranged in a matrix. The photoelectric sensing unit is used to convert the received optical signal into a digital pulse signal, wherein the optical signal is the light reflected from the target object to the photoelectric receiving module after receiving the transmitted optical signal. The signal accumulation module is electrically connected to the photoelectric receiving module, which is used to accumulate the received pulse signals to obtain an accumulation signal, and to sample the accumulation signal according to the sampling signal to obtain a digital accumulation signal, which represents the first position range of the target object.

According to another embodiment, the invention provides a photoelectric sensing ranging method, which may be implemented using the module described above. The module comprises a plurality of photoelectric sensing units arranged in a matrix. The photoelectric sensing unit is used to convert the received optical signal into a pulse signal in digital form. The optical signal is the light reflected from the target object to the photoelectric receiving module after receiving the transmitted optical signal. The method comprises the following steps:

Accumulating the received pulse signals to obtain an accumulation signal, sampling the accumulation signal according to the sampling signal to obtain a digital accumulation signal, and the digital accumulation signal represents the first position range of the target object; and The time interval from detecting the emitted light signal to the time interval when the photoelectric receiving module receives the light signal is timed, the time digital signal is obtained according to the time interval to characterize the distance of the target object, and the first position of the target object is determined within the range of the first position according to the distance of the target object.

According to another embodiment, the invention provides a distance measuring device, which may include the aforementioned photoelectric sensor acquisition module, data processing module, and signal transmission module. The signal transmitting module and The module are electrically connected to the data processing module. The signal transmitting module is used to transmit optical signals to the target object. The data processing module is used to process the received digital accumulation signal and the time digital signal, and calculate the distance of the target object.

It is to be appreciated that compared with existing techniques, embodiments of the present invention provide a photoelectric sensing acquisition module that functions similar to an analog-to-digital converter (ADC), and it is used in conjunction with TDC architecture to achieve high precision ranging mechanism that is suitable for both long and short distance.

The present invention achieves these benefits and others in the context of known technology. However, a further understanding of the nature and advantages of the present invention may be realized by reference to the latter portions of the specification and attached drawings.

DETAILED DESCRIPTION OF THE INVENTION

Figure 1:
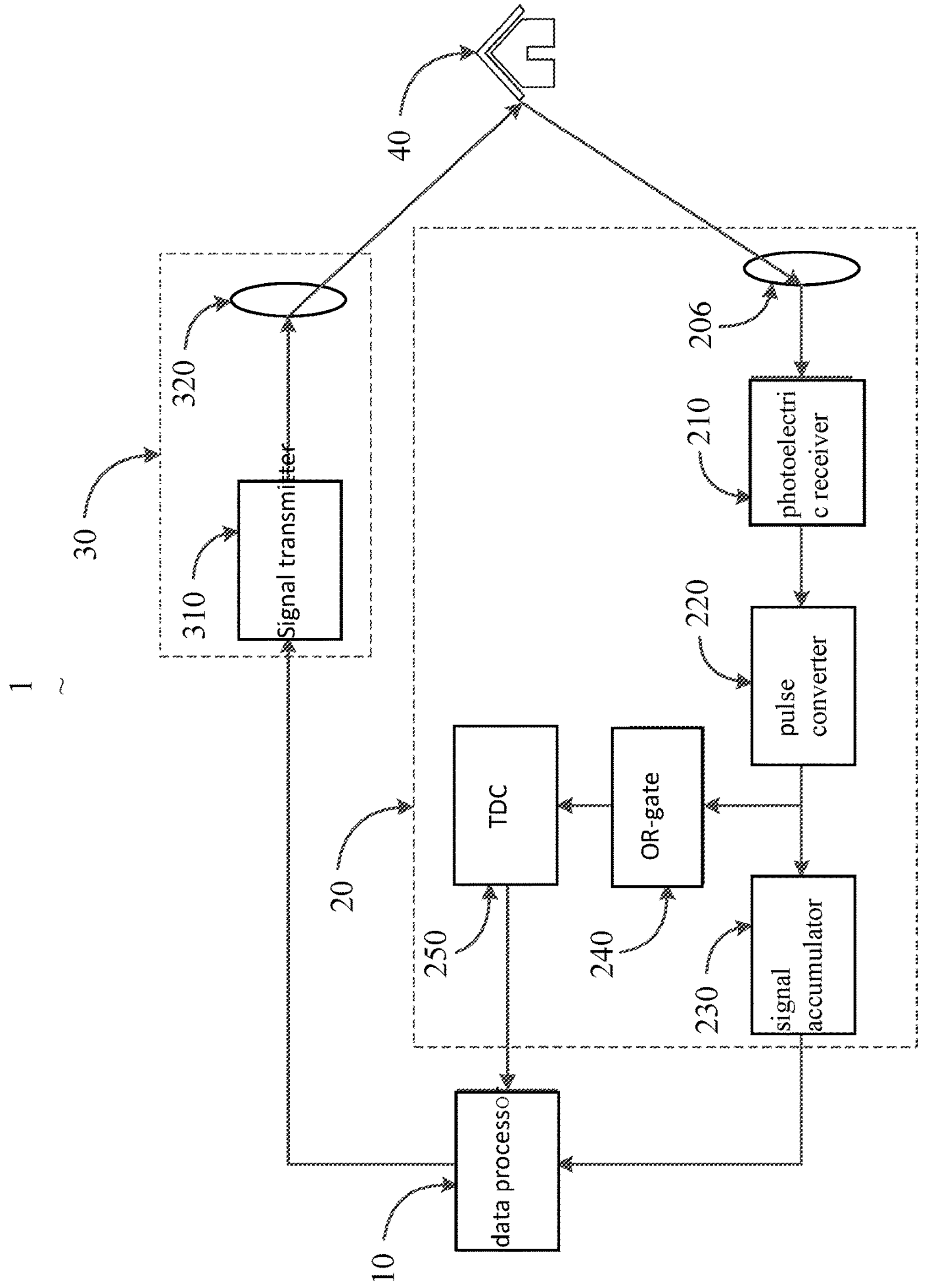
FIG. 1 is a ranging device according to embodiments of the present invention.

The present invention relates generally to photoelectric detection technology, in particular to photoelectric sensing acquisition modules and distance measuring devices.

According to existing techniques, the output signal of the photoelectric sensor is usually measured through the circuit structure. In practice, the distance measurement accuracy is relatively low, and the analog-to-digital converter (ADC) scheme is generally adopted. The short distance requires high-ranging accuracy, which is more suitable for the time-to-digital converter (TDC) scheme.

In the ranging process, if the photoelectric sensor processes the received optical signal and transmits it to ADC, ADC can convert the received signal into a digital signal in direct proportion, and can determine the position of the target object once detected. However, the ADC scheme has the disadvantages of high technical difficulty, high process requirements, high cost, low ranging accuracy, high power consumption, etc., which limits its invention scope.

To solve the above problems, embodiments of the invention provide a photoelectric sensing acquisition module with high accuracy, a photoelectric sensing ranging method, and a ranging device.

In various embodiments, the present invention provides a photoelectric sensing acquisition module, which comprises a photoelectric receiving module and a signal accumulation module. The photoelectric receiving module comprises a plurality of photoelectric sensing units arranged in a matrix. The photoelectric sensing unit is used to convert the received optical signal into a digital pulse signal, wherein the optical signal is the light reflected from the target object to the photoelectric receiving module after receiving the transmitted optical signal. The signal accumulation module is electrically connected to the photoelectric receiving module, which is used to accumulate the received pulse signals to obtain an accumulation signal, and to sample the accumulation signal according to the sampling signal to obtain a digital accumulation signal, which represents the first position range of the target object.

The invention, in various implementations, provides a photoelectric sensing ranging method, which is applied to the module. The module comprises a plurality of photoelectric sensing units arranged in a matrix. The photoelectric sensing unit is used to convert the received optical signal into a pulse signal in digital form. The optical signal is the light reflected from the target object to the photoelectric receiving module after receiving the transmitted optical signal.

According to an embodiment, the present invention provides a method that includes accumulating the received pulse signals to obtain an accumulation signal, sampling the accumulation signal according to the sampling signal to obtain a digital accumulation signal, and the digital accumulation signal represents the first position range of the target object. The time interval from detecting the emitted light signal to the time interval when the photoelectric receiving module receives the light signal is timed, the time digital signal is obtained according to the time interval to characterize the distance of the target object, and the first position of the target object is determined within the range of the first position according to the distance of the target object.

In a specific embodiment, the present invention provides a distance-measuring device, including the aforementioned photoelectric sensor acquisition module, data processing module, and signal transmission module. The signal transmitting module and the module are electrically connected to the data processing module. The signal transmitting module is used to transmit optical signals to the target object. The data processing module is used to process the received digital accumulation signal and the time digital signal, and calculate the distance of the target object.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counterclockwise have been used for convenience purposes only and are not intended to imply any particular fixed direction. Instead, they are used to reflect relative locations and/or directions between various portions of an object.

FIG. 1 is the structural diagram of the ranging device 1 in the embodiment of the present invention. As shown in FIG. 1, the ranging device 1 comprises a data processing module 10, a photoelectric sensor acquisition module 20, a signal transmission module 30, a target object 40, and other functional modules (not shown in the figure). In this embodiment, the ranging device 1 measures the distance from the target object by non-contact measurement.

The signal transmitting module 30 is configured to transmit optical signals (e.g., laser pulses) to the target object 40. The signal transmitting module 30 comprises a signal transmitting module 310 and a first light transmitting unit 320. The signal transmitting module 310 is electrically connected to the data processing module 10 for outputting optical signals under the control of the data processing module. The light transmitting unit 320 gathers the optical signals transmitted by the signal transmitting module 310 and transmits them to the target object 40 to increase the intensity of the optical signals reflected by the target object 40.

The photoelectric sensing acquisition module 20 is used to receive the optical signal reflected by the target object 40 and convert the received optical signal into an electrical signal for measuring the distance of the target object 40.

Further, the photoelectric sensor acquisition module 20 converts the received optical signal into a digital pulse signal Fn, and accumulates multiple pulse signals Fn to obtain the accumulation signal J1. After sampling the accumulation signal J1, the digital accumulation signal L1 is obtained, and the distance information of the target object 40 is obtained according to the digital accumulation signal L1.

Furthermore, the photoelectric sensor acquisition module 20 can also calculate the time interval Δt between the optical signal sent by the transmission module 30 and the optical signal received by the photoelectric sensor acquisition module 20. Obtain the distance information of the target object 40 by using Δt.

The data processing module 10 is electrically connected to the signal transmitting module 30 and the photoelectric sensor acquisition module 20, and is used to obtain the first position range of the target object according to the received digital accumulation signal L1. At the same time, based on the first position range, calculate the distance of the target object 40 by using Δt.

The photoelectric sensor acquisition module 20 comprises a photoelectric receiving module 210, a pulse conversion module 220, a signal accumulation module 230 (e.g., implemented using digital accumulator and sampler, or DAS), an OR-gate module 240, a time digital conversion module 250, and a second light transmitting unit 206.

The photoelectric receiving module 210 comprises a plurality of photoelectric sensing units arranged in a matrix. The photoelectric sensing unit is used to convert the received optical signal into a digital pulse signal Fn, wherein the optical signal comprises the light reflected from the target object 40 to the photoelectric receiving module 210 after receiving the transmitted optical signal. In the embodiment of the present invention, the second light transmitting unit 206 is used to gather the optical signals reflected by the target object 40 together to reduce the impact of other optical signals on the photoelectric receiving module 210.

Specifically, the photoelectric receiving module 210 (e.g., SiPM or SPADs) comprises a plurality of photoelectric receiving units, such as single photon avalanche diodes (SPADs), with substantially the same structure and function.

The pulse conversion module 220 is electrically connected between the photoelectric receiving module 210 and the signal accumulation module 230 to adjust the pulse width of the pulse signal Fn received by the photoelectric receiving module 210. Fn is input to the signal accumulation module 230. Specifically, the pulse conversion module 220 comprises a plurality of pulse conversion units with the same structure and function.

The signal accumulation module 230 is electrically connected to the photoelectric receiving module 210, which is used to accumulate the received pulse signal Fn to obtain the accumulation signal J1. Sample the accumulation signal J1 according to the sampling signal CLK to obtain the digital accumulation signal L1, wherein the digital accumulation signal L1 represents the first position range of the target object.

Specifically, the signal accumulation module 230 comprises a plurality of signal accumulation units with the same structure and function.

The OR-gate module 240 is electrically connected between the pulse conversion module 220 and the time digital conversion module 250. It is used to convert an optical signal received by any photoelectric sensing unit into a pulse signal Fn and transmit it to the time digital conversion module 250 to characterize the optical signal received by the photoelectric receiving module 210.

In the embodiment of the invention, the OR-gate module 240 comprises at least one level OR-gate unit, and the one-level OR-gate unit comprises at least a plurality of OR-gate inputs and a plurality of OR-gate outputs.

In the embodiment of the invention, OR-gate module 240 can also be combined with NAND gates or other logic circuits.

The time digital conversion module 250 is electrically connected to the OR-gate module 240, and is used to measure the time interval Δt between the optical signal transmitted by the signal transmitting module 310 and the optical signal received by the photoelectric receiving module 210. Determine the distance of the target object 40 by using Δt, and determine the first position of the target object 40 in the first position range.

When the transmitting module 30 transmits the optical signal, it controls the time digital conversion module 250 starts receiving the trigger signal. The trigger signal is used to control the time digital conversion module 250 to start calculating the time interval of the optical signal transmission Δt. Specifically, the time digital conversion module 250 comprises a plurality of time digital conversion units with the same structure and function.

In the embodiment of the invention, when the signal transmitting module 30 transmits the optical signal, the time digital conversion module 250 starts timing according to the trigger signal. After the optical signal is reflected by the target object 40, the photoelectric receiving module 210 receives the reflected optical signal and converts the received optical signal into the pulse signal Fn of the digital signal. When the pulse signal Fn is transmitted to the time digital conversion module 250 through the OR-gate module 240, The time digital conversion module 250 stops timing.

In the embodiment of the invention, the pulse width of the pulse signal Fn is at least twice the sampling period of the sampling signal CLK.

In this embodiment, other functional modules include a power module, communication module, clock module, transmission module, display module, security detection module, and shell. The power module is used to provide the driving voltage Vcc, required by the ranging device 1. The power module can be the battery or the battery pack, or other external equipment. The communication module is used to output the distance information between the ranging device 1 and the target object, and can also be used to input other control signals to the data processing module 10. The communication module can be used to communicate with other devices, and the other signals can be terminal control commands, etc.

Figure 2:
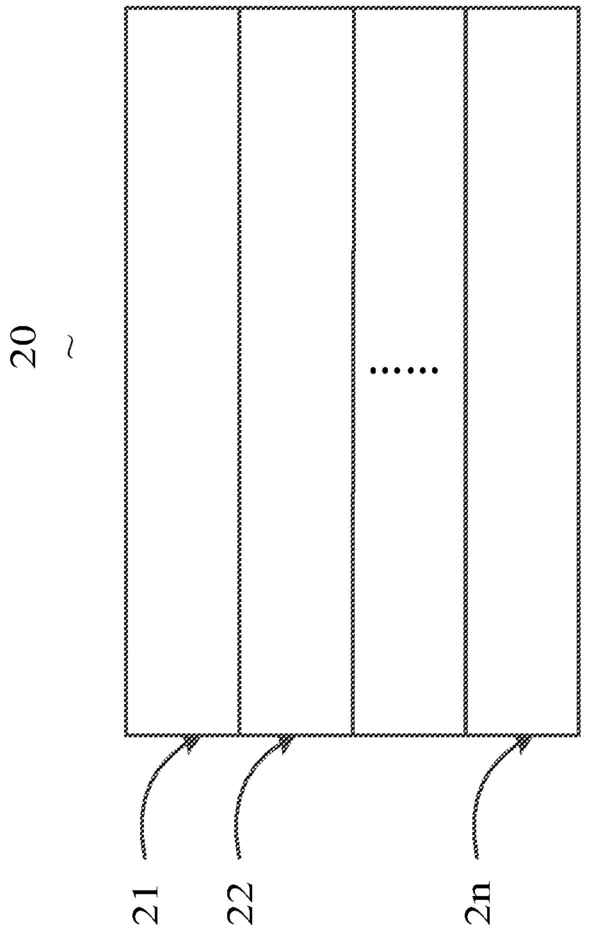
FIG. 2 is the specific structure diagram of the photoelectric sensor acquisition device in the structure diagram of FIG. 1 according to embodiments of the present invention.

FIG. 2 is the specific structure diagram of the photoelectric sensor acquisition module 20 shown in FIG. 1 in the embodiment of the invention. As shown in FIG. 2, the photoelectric sensor acquisition module 20 comprises the first photoelectric sensor acquisition module 20, the second photoelectric sensor acquisition module 22, the N-th photoelectric sensor acquisition module 2*n*. As an example, photoelectric sensor acquisition module comprises photoelectric receiving module, pulse conversion module, signal accumulation module, OR-gate module, and/or time digital conversion module.

Specifically, the circuit structure and working principle of the first photoelectric sensor acquisition module 20, the second photoelectric sensor acquisition module 22, and the N-th photoelectric sensor acquisition module 2*n* are substantially the same. For example, photoelectric sensor acquisition module may be configured in the photoelectric sensor acquisition module 20, and in various embodiments is not repeated for other photoelectric sensor acquisition modules.

Figure 3:
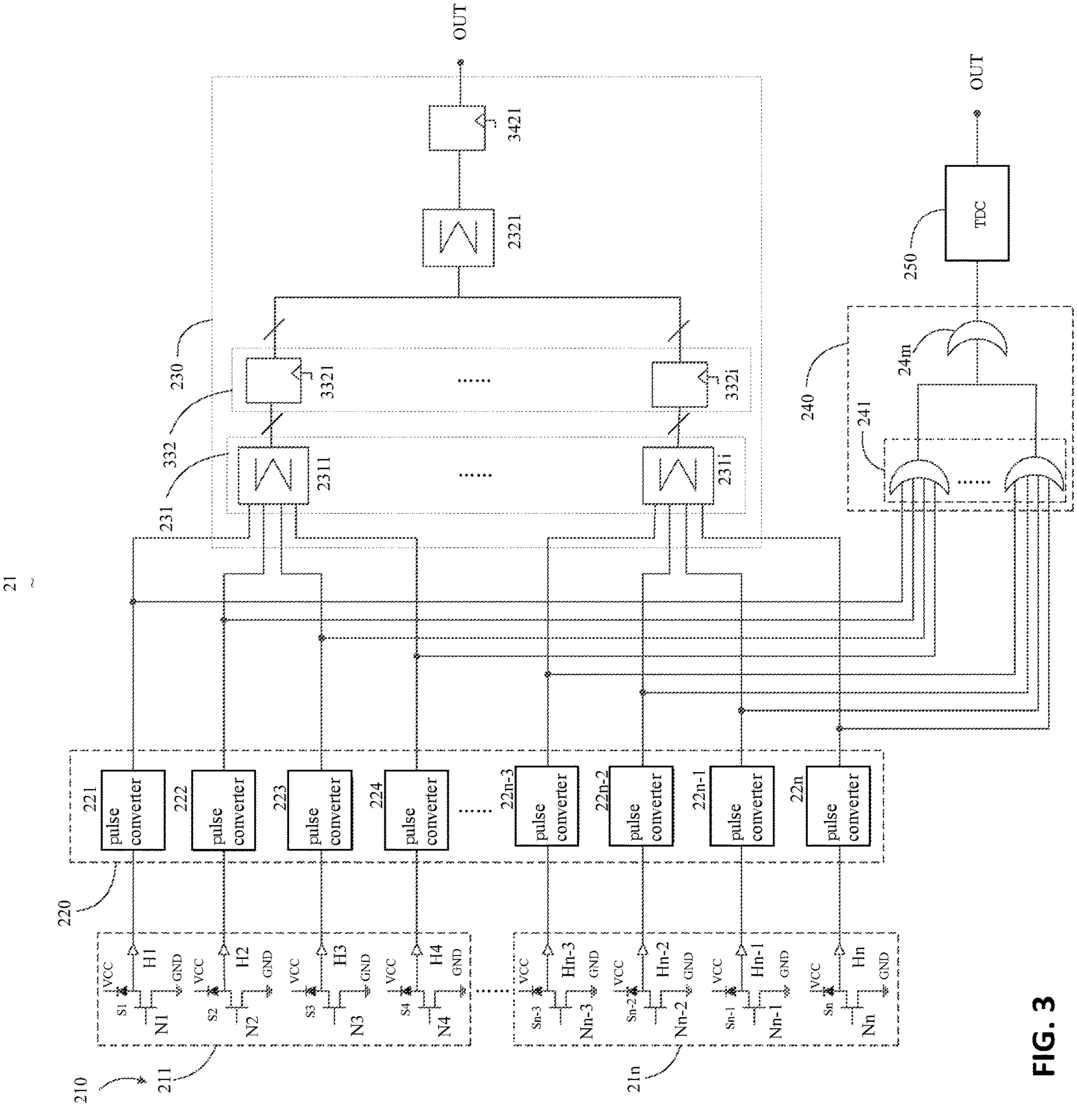
FIG. 3 is the block diagram of any photoelectric sensor acquisition module in the structure diagram of FIG. 2 according to embodiments of the present invention.

FIG. 3 is the schematic diagram of any photoelectric sensor acquisition module 20 shown in FIG. 2 in the embodiment of the invention. As shown in FIG. 3, the photoelectric sensor acquisition module 20 comprises a photoelectric receiving module 210, a pulse conversion module 220, a signal accumulation module 230 (or referred to as digital accumulator and sampler, or DAS), an OR-gate module 240, and a time digital conversion module 250. The photoelectric sensor acquisition module 20 is used to convert the received optical signal into a pulse signal Fn according to the received optical signal. In the same sampling period, multiple pulse signals Fn are accumulated to obtain the transmission time of the optical signal with the highest signal intensity, and then analyze and calculate the precise position of the target object.

The photoelectric receiving module 210 is configured to convert the received optical signal into a digital pulse signal Fn (e.g., a pulse of electrical current). Input Fn to the pulse conversion module 220. The photoelectric receiving module 210 comprises a plurality of photoelectric sensing units arranged in a matrix. Specifically, a photoelectric sensing unit (e.g., a SPAD pixel) converts the received optical signal into a digital pulse signal Fn. The optical signal comprises the light reflected from the target object to the photoelectric receiving module 210 after receiving the transmitted optical signal.

As shown in FIG. 3, the photoelectric receiving module 210 comprises a array composed of multiple first receiving subunits 211, a number of subunits, and the N-th receiving subunit 21*n*. For example, the first receiving subunit 211 and the N-th receiving subunit 21*n* are configured parallel and connected between the drive voltage terminal VCC and the ground terminal GND at the same time. Receiving subunit can convert the optical signal into a pulse signal Fn for output, where n is greater than or equal to 1. The drive voltage terminal VCC is configured to provide the drive voltage Vcc needed by the photoelectric sensor acquisition module 20.

Further, the working principle and working process of the N-th receiving subunit 21*n* in the photoelectric receiving module 210 are the same as those of the first receiving subunit 211. In this embodiment, the first receiving subunit 211 is described in detail. For other receiving subunits in the photoelectric receiving module 210, this embodiment will not be repeated.

The first receiving subunit 211 comprises a first transistor N1, a second transistor N2, a third transistor N3, a fourth transistor N4, a first photoelectric sensing unit S1, a second photoelectric sensing unit S2, a third photoelectric sensing unit S3, a fourth photoelectric sensing unit S4, a first buffer unit H1, a second buffer unit H2, a third buffer unit H3, and a fourth buffer unit H4.

Specifically, the first photoelectric sensing unit S1 is electrically configured between the drive voltage terminal VCC and the source of the first transistor N1, the first buffer unit H1 is electrically connected between the source of the first transistor N1 and the pulse conversion module 220, and the drain of the first transistor N1 is electrically connected to the ground terminal GND. The second photoelectric sensing unit S2 is electrically connected between the drive voltage terminal VCC and the source of the second transistor N2, the second buffer unit H2 is electrically connected between the source of the second transistor N2 and the pulse conversion module 220, and the drain of the second transistor N2 is electrically connected to the ground terminal GND. The third photoelectric sensing unit S3 is electrically connected between the drive voltage terminal VCC and the source of the third transistor N3, the third buffer unit H3 is electrically connected between the source of the third transistor N3 and the pulse conversion module 220, and the drain of the third transistor N3 is electrically connected to the ground terminal GND. The fourth photoelectric sensing unit S4 is electrically connected between the drive voltage terminal VCC and the source of the fourth transistor N4, the fourth buffer unit H4 is electrically connected between the source of the fourth transistor N4 and the pulse conversion module 220, and the drain of the fourth transistor N4 is electrically connected to the ground terminal GND.

In an embodiment of the invention, when the photoelectric sensing unit S receives the optical signal, the photoelectric sensing unit S is turned on, and the drive voltage Vcc is buffered by the buffer unit H and then input to the pulse conversion module 220.

In an embodiment of the invention, the photoelectric sensing unit S can be a single photon detector (SPAD), and the photoelectric receiving module 210 is a silicon photomultiplier (SiPM), which is composed of multiple SPADs in parallel.

When the first photoelectric sensing unit S1 receives the optical signal, the first photoelectric sensing unit S1 is electrically conductive, the drive voltage Vcc is input to the first buffer unit H1 through the first photoelectric sensing unit S1, and is input to the pulse conversion module 220 after buffering by the first buffer unit H1. If the first photoelectric sensing unit S1 does not receive the optical signal, the first photon detector S1 is electrically off. When the second photoelectric sensing unit S2 receives the optical signal, the second photoelectric sensing unit S2 is electrically connected, and the drive voltage Vcc is input to the pulse conversion module 220 through the second photoelectric sensing unit S2. If the second photoelectric sensing unit S2 does not receive the optical signal, the second photoelectric sensing unit S2 is electrically off. When the third photoelectric sensing unit S3 receives the optical signal, the third photoelectric sensing unit S3 is electrically connected, and the drive voltage Vcc is input to the pulse conversion module 220 through the third photoelectric sensing unit S3.

If the third photoelectric sensing unit S3 does not receive the optical signal, the third photoelectric sensing unit S3 is electrically off. When the fourth photoelectric sensing unit S4 receives the optical signal, the fourth photoelectric sensing unit S4 is electrically on, and the drive voltage Vcc is input to the pulse conversion module 220 through the fourth photoelectric sensing unit S4. If the fourth photoelectric sensing unit S4 does not receive the optical signal, the fourth photoelectric sensing unit S4 is electrically off.

In other embodiments of the present invention, the first receiving subunit 211 comprises at least X transistors, X photoelectric sensing units, and X buffer units, wherein X is a positive integer greater than or equal to 1.

The pulse conversion module 220 is electrically connected between the photoelectric receiving module 210 and the signal accumulation module 230, and is also electrically connected to the or-gate module 240 to adjust the pulse width of the pulse signal Fn received by the photoelectric receiving module 210, and output to the signal accumulation module 230 and the or-gate module 240. The pulse conversion module 220 comprises the first pulse conversion circuit 220, the second pulse conversion circuit 222, the third pulse conversion circuit 223, the fourth pulse conversion circuit 224, the n-3 pulse conversion circuit **22*n*-3, the n-2 pulse conversion circuit 22*n*-2, the n-1 pulse conversion circuit 22*n*-1, and the n-th pulse conversion circuit 22*n***.

In this embodiment, the pulse width of the adjusted pulse signal Fn is between 1 ns and 10 ns. The preset number of pulse conversion circuits in the pulse conversion module 220 is the same as the total number of photoelectric sensing units S.

The first pulse conversion circuit 220 is electrically connected between the first buffer unit H1 and the signal accumulation module 230 to adjust the pulse width of the first pulse signal F1. When the first pulse conversion circuit 220 receives the first pulse signal F1, adjust the pulse width of the first pulse signal F1 between 1 ns-10 ns. In the embodiment of the invention, the second pulse conversion circuit 222, the third pulse conversion circuit 223, the fourth pulse conversion circuit 224, . . . the n-3 pulse conversion circuit **22*n*-3, the n-2 pulse conversion circuit 22*n*-2, the n-1 pulse conversion circuit 22*n*-1, and the n-1 pulse conversion circuit 22*n* have the same circuit structure and working process as the first pulse conversion circuit 220**, and will not be described here.

The signal accumulation module 230 is electrically connected to the pulse conversion module 220, which is used to accumulate the received pulse signal Fn to obtain the accumulation signal J1. Sample the accumulation signal J1 according to the sampling signal CLK to obtain the digital accumulation signal L1. And obtain the first position range of the target object according to the digital accumulation signal L1.

The signal accumulation module 230 comprises at least one level of signal accumulation subunit and at least one level of signal sampling unit. The signal accumulation subunit at each level is correspondingly connected to a preset number of pulse conversion units, and the last level of signal accumulation subunit is used to accumulate the preset number of pulse signals Fn and transmit them to the last level of signal sampling unit.

The last level signal sampling unit is electrically connected to the pulse output terminal OUT. The signal sampling unit is used to sample the received accumulation signal J1 according to the sampling signal, and output the digital accumulation signal L1 with different signal intensity values. The digital accumulation signal L1 is output through the pulse output terminal OUT.

The signal accumulation module 230 comprises a cascaded N-level signal accumulation subunit and an M-level signal sampling unit. When the signal accumulation subunit performs a signal accumulation, the signal sampling unit performs a signal sampling. N and M are both greater than or equal to 2.

In the embodiment of the invention, the delay of the signal sampling unit is greater than the sampling period of the sampling signal. And the signal accumulation subunit of each level is correspondingly connected with the signal sampling subunit to perform signal sampling on the accumulated signal.

As shown in FIG. 3, in the signal accumulation module 230, the signal accumulation subunit and the signal sampling subunit have the same electrical connection and function. In this embodiment, the first level signal accumulation subunit 231 and the first level signal sampling module 232 are described. Other signal accumulation subunits and signal sampling units will not be described in detail.

The first level signal accumulation subunit 231 is electrically connected between the pulse conversion module 220 and the first level signal sampling unit 232. The first level signal accumulation subunit 231 is used to convert the pulse signal Fn received by the pulse conversion module 220 into a digital signal and input the digital signal to the first level signal sampling unit 232 to perform signal sampling. The first level signal accumulation subunit 231 comprises the first signal accumulator 2311, the i-th signal accumulator **231*i*, and the first level signal sampling unit 232 comprises the first signal sampling unit 3321, . . . the i-th signal sampling unit 332*i***.

In the embodiment of the invention, the signal accumulation subunit of each level is correspondingly connected with the signal acquisition subunit to sample the accumulated signal.

The pulse output end OUT is electrically connected to the data processing module 10 through the bus (FIG. 1). The first position range is the position range wherein the target object reflects the light signal. The signal sampling unit can be realized by using a flip-flop, and the flip-flop can include a rising edge flip-flop or a falling edge flip-flop.

In the embodiment of the present invention, the input ends of each of signal accumulator are connected to the preset number of pulse conversion modules, the output ends of the signal accumulator are respectively electrically connected to the input ends of the first signal sampling unit 3321, i-th signal sampling unit **332*i*. The first signal sampling unit 3321 . . . the i-th signal sampling unit 332*i*** outputs the accumulation signals to the second level signal accumulation subunit.

The first signal accumulator 2311, . . . the i-th signal accumulator **231*i* converts the received pulse signal Fn into a digital signal and accumulates it, converts the accumulated pulse signal into a binary signal, accumulates the binary signal to obtain the accumulated signal J1, and outputs it to the second signal sampling unit 232 through the first signal sampling unit 3321, . . . the i-th signal sampling unit 332*i*, Finally, it is output to the pulse output terminal OUT through the last level signal sampling unit 3421. The first signal accumulator 2311, . . . the i-th signal accumulator 231*i* respectively accumulates the received pulse signals Fn to obtain the digital signals that vary with the signal intensity, samples them through the first level signal sampling unit 332, and inputs the sampled signals to the second level signal accumulation subunit until all the pulse signals Fn input by the signal accumulation unit 230 are accumulated step by step to the N-th level signal accumulation subunit, The target accumulation signal is obtained after sampling by the last level signal sampling unit 3421** sampling unit.

For example, in the photoelectric sensor acquisition module 20, there are 100 single-photon detectors in total. The signal accumulation unit 230 accumulates every four pulse signals, so the first level signal accumulation subunit 231 has 25 signal accumulators in total, and the first level signal sampling unit 332 has 25 signal sampling units in total, The input end of the signal accumulation unit in the second level signal accumulation subunit 232 receives the pulse signals output by any two signal accumulators in the first level signal accumulation subunit 231, and the second signal accumulation subunit 232 has 13 signal accumulators in total. That is, all the pulse signals Fn in the photoelectric sensor acquisition module 20 are successively accumulated to the last signal accumulation subunit.

The last level signal sampling unit 3421 is electrically connected to the pulse output terminal OUT, which is used to sample the received accumulation signal J1 according to the sampling signal CLK, and output the target accumulation signal. The target accumulation signal is input to the data processing module 10 (FIG. 1) through the pulse output terminal OUT.

For example, in the same sampling period, the pulse signals which are input at the input end of the first signal accumulator 231 include the first pulse signal F1 and the second pulse signal F2. F1 is a valid signal, F2 is an invalid signal, the third pulse signal F3 is a valid signal, and the fourth pulse signal F4 is a valid signal. At this time, the signal intensity value of the first signal accumulator 2311 after accumulating the pulse signals at the input end is 3.

In the embodiment of the invention, the valid signal is represented by the digital signal 1, and the invalid signal is represented by the digital signal 0.

In the same sampling period, after all the pulse signals Fn output from the photoelectric receiving module 210 are accumulated to the last level signal accumulation subunit 2321, the last level signal sampling unit 3421 samples the pulse signals in the last level signal accumulation subunit 2321 to obtain the digital accumulation signal L1, and finally outputs the discrete digital accumulation signal L1 of the target object to the data processing module 10.

To ensure the ranging accuracy, the pulse width of the pulse signal Fn is greater than or equal to the sampling period of the sampling signal CLK. Preferably, the pulse width of the pulse signal Fn is at least twice the sampling period of the sampling signal CLK. For example, if the pulse width of the pulse signal Fn is 2 ns, the sampling period of the sampling signal CLK is less than or equal to 1 ns.

In the embodiment of the invention, the number of sampling cycles is based on the data of the sampling measurement distance. T=2L/f*c, wherein T is the number of sampling cycles, L is the measurement distance, f is the sampling period of the sampling signal CLK, and c is the speed of light.

The OR-gate module 240 is electrically connected between the pulse conversion module 220 and the time digital conversion module 250. It is used to transmit the converted pulse signal Fn to the time digital conversion module 250 when any photoelectric sensing unit S in the photoelectric receiving module 210 receives the optical signal, to indicate that the photoelectric receiving module 210 receives the optical signal. The OR-gate module 240 at least comprises one-level OR-gate subunit. Specifically, one-level OR-gate subunit comprises a plurality of OR-gate input terminals and an OR-gate output terminal. The total number of one-level OR-gate input terminals is the same as the number of the photoelectric sensing unit S. Among them, one-level OR-gate input terminal is electrically connected to at least one pulse conversion module 220, and the OR-gate output terminal is electrically connected to the time digital conversion module 250. When any input terminal of the OR-gate subunits receives the pulse signal Fn, output terminal of the OR-gate subunits outputs the pulse signal Fn to the time digital conversion module 250. After receiving the pulse signal Fn, if all the pulse signals Fn are valid, the OR-gate unit outputs the pulse signals. If the pulse signal Fn comprises at least one valid pulse signal, the OR-gate unit outputs the pulse signal Fn. If all pulse signals Fn are invalid pulse signals, OR-gate unit will not output pulse signal Fn.

In this embodiment, OR-gate module 240 comprises the first level OR-gate subunit 241, the K level OR-gate subunit **24*k*, wherein K is at least two. The first level OR-gate subunit 241 comprises at least j OR-gate circuits, wherein j is an integer greater than 1, and j OR-gate circuits perform OR-gate operations on a preset number of pulse signals Fn and input them to the second OR-gate subunit. The second level OR-gate subunit to the K-level OR-gate subunit performs OR-gate operation step by step for the pulse signal and transmits it to the time digital conversion module 250**. Each OR-gate circuit comprises four OR-gate inputs and one OR-gate output. If the input signal of the OR-gate input terminal comprises at least one pulse signal, the OR-gate circuit only outputs the pulse signal to the next OR-gate circuit.

For example, in the photoelectric sensor acquisition module 20, the photoelectric receiving module 210 outputs 100 pulse signals Fn, wherein the pulse signals include at least one pulse signal. In the OR-gate module 240, every four pulse signals are input into one OR-gate circuit. The first level OR-gate subunit 241 comprises 25 OR-gate circuits, and all pulse signals Fn are input to the K-level OR-gate subunit **24*k*, and the K-level OR-gate subunit 24*k* finally outputs pulse signals to the time digital conversion module 250**.

The time digital conversion module 250 is electrically connected to the OR-gate module 240, and is used to measure the time interval Δt between the optical signal emitted by the signal transmitting module 310 and the optical signal received by the photoelectric receiving module 210. By using time interval ΔT, determine the distance of the target object, and determine the first position of the target object in the first position range according to the distance of the target object.

The signal transmitting module 310 repeatedly transmits optical signals for many times, and the time digital conversion module 250 measures the transmission time Δt between each optical signal and the output pulse signal Fn of the photoelectric receiving module 210. According to s=c×ΔT/2, wherein c is the speed of light, so as to calculate the distance of the target object.

Figure 4:
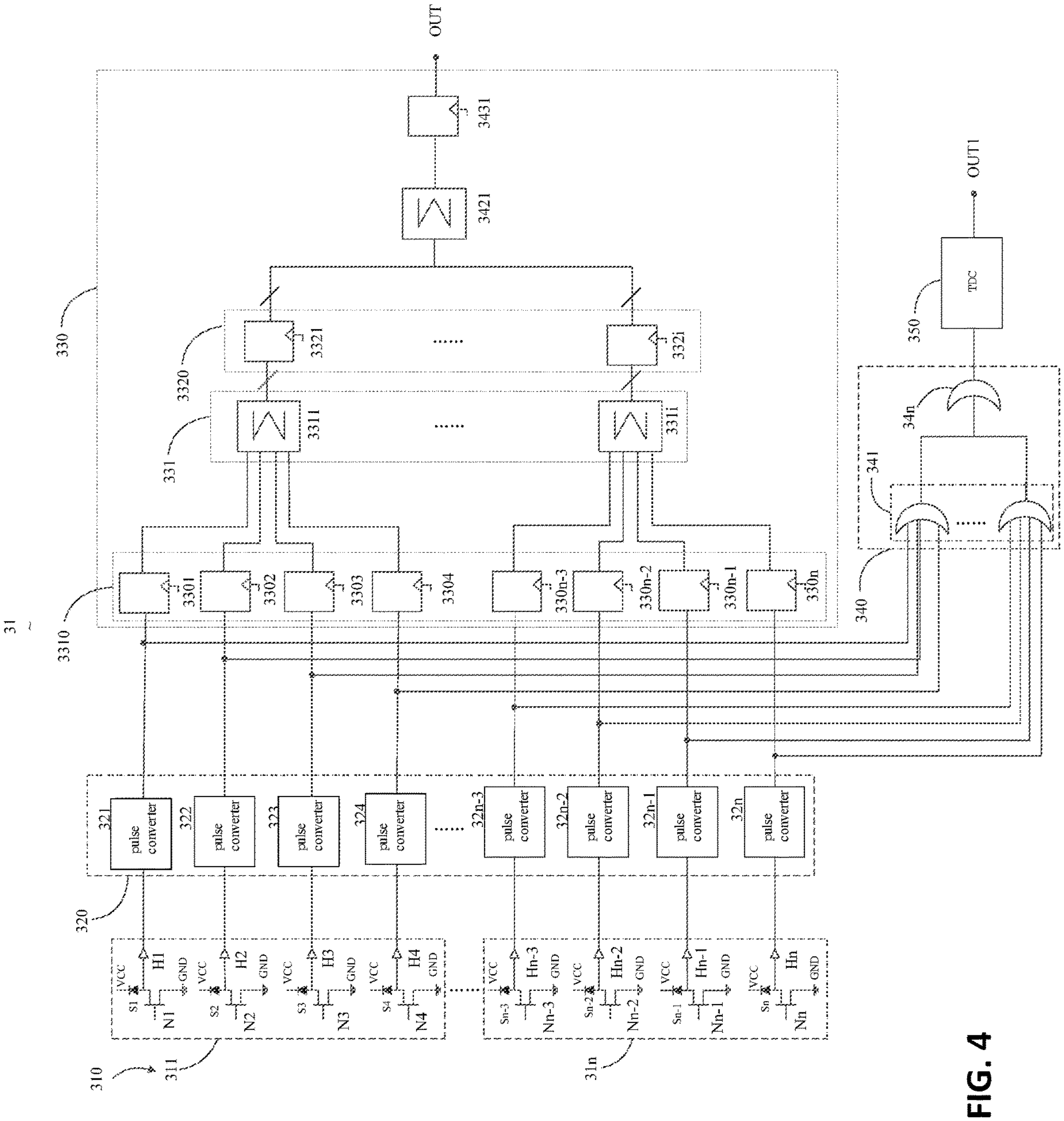
FIG. 4 is the block diagram of any photoelectric sensor acquisition module in another embodiment of FIG. 2 according to embodiments of the present invention.

Refer to FIG. 4, which is the schematic diagram of any photoelectric sensor acquisition module 31 shown in FIG. 2 in another embodiment of the invention. As shown in FIG. 4, module 31 comprises a photoelectric receiving module 310, a pulse conversion module 320, a signal accumulation module 330, an OR-gate module 340, and a time digital conversion module 350. The circuit structure and function of the photoelectric receiving module 310, pulse conversion module 320, OR-gate module 340, and time digital conversion module 350 are the same as those in the above embodiment, and will not be described in this embodiment.

The difference between the signal accumulation module 330 and the above embodiments is that the signal accumulation module 330 comprises an N-level signal accumulation subunit and an M-level signal sampling unit, wherein N and M are both greater than or equal to 2. Between a level I signal accumulation subunit 331 and a pulse conversion module 320 is a level I signal sampling unit 3310. The level I signal sampling unit 3310 samples the pulse signal Fn and transmits it to the level I signal accumulation subunit 331. The level I signal sampling unit 3310 comprises a first input signal sampling unit 3301, the N-th input signal sampling unit 330*n*. Among them, the number (n) of input signal sampling units is the same as the total number of pulse signals Fn.

In order to ensure the ranging accuracy, in the above example of setting multi-level signal sampling units, the pulse width of the pulse signal Fn is greater than or equal to the sampling period of the sampling signal CLK. The circuit delay of any two adjacent level signal sampling units is less than the sampling period of the sampling signal CLK.

Figure 5:
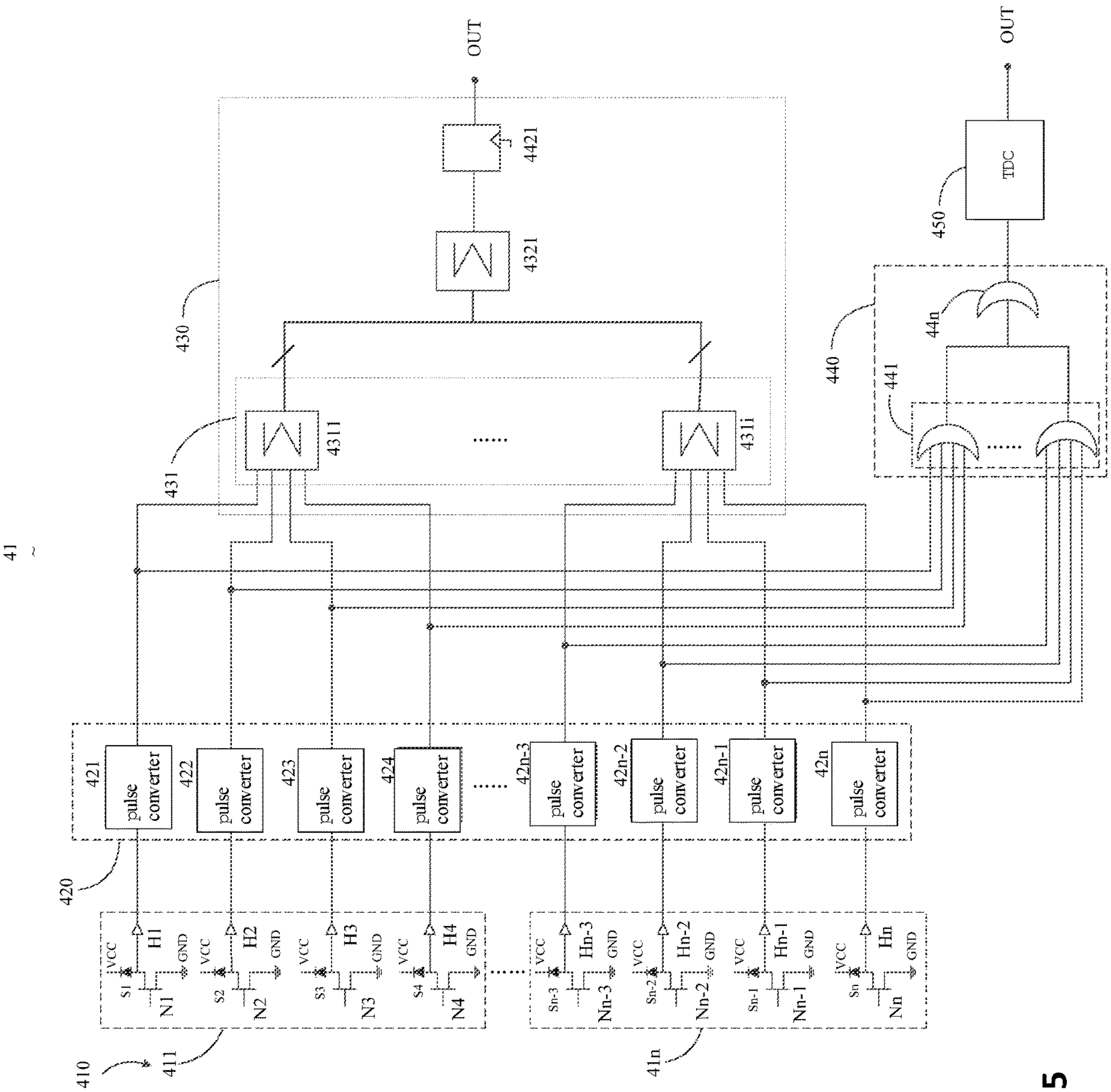
FIG. 5 is the block diagram of any photoelectric sensor acquisition module in another embodiment of FIG. 2 according to embodiments of the present invention.

FIG. 5 is the schematic diagram of any photoelectric sensor acquisition module 41 shown in FIG. 2 in another embodiment of the invention. As shown in FIG. 5, The photoelectric sensor acquisition module 41 comprises a photoelectric receiving module 410, a pulse conversion module 420, a signal accumulation module 430, an OR-gate module 440, and a time digital conversion module 450. The circuit structure and function of the photoelectric receiving module 410, pulse conversion module 420, OR-gate module 440, and time digital conversion module 450 are the same as those in the above embodiment, and will not be described in this embodiment.

The difference between the signal accumulation module 430 and the above embodiments is that the signal accumulation module 430 comprises a cascaded N-level signal accumulation subunit and a first level signal sampling unit 4421. N is greater than or equal to 2. The first level signal accumulation subunit in the N-level signal accumulation subunit comprises a first signal accumulator 4311, the i-th signal accumulator 431*i*, and i is an integer greater than 1. The i-th signal accumulators perform the first signal accumulation for the preset number of pulse signals Fn, and obtain i cumulative signals. From the second level signal accumulation subunit to the N-th level signal accumulation subunit in the N-th level signal accumulation subunit gradually accumulate the i cumulative signals to obtain the target cumulative signals. The first level signal sampling unit 4421 is electrically connected between the output end of the N-th level signal accumulation subunit and the output end OUT of the signal accumulation module 430, and samples the received target accumulation signal to obtain the digital accumulation signal L1.

Similarly, in order to ensure the ranging accuracy, the pulse width of the pulse signal Fn in this embodiment needs to be greater than or equal to the sampling period of the sampling signal CLK. Preferably, the pulse width of the pulse signal Fn is greater than or equal to twice of the sampling period of the sampling signal CLK.

Figure 6:
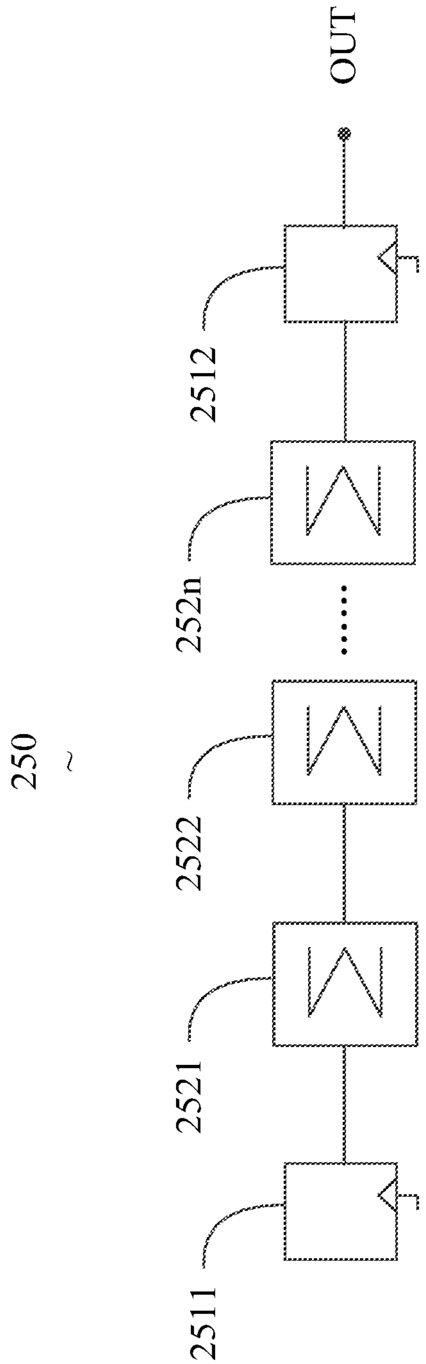
FIG. 6 is the structural diagram of the signal accumulation module according to embodiments of the present invention.

Please refer to FIG. 6, which is the structural diagram of the signal accumulation module in another embodiment of the invention. As shown in FIG. 6, the signal accumulation module 250 is used to accumulate the received pulse signal Fn to obtain the accumulation signal J1. Sample the accumulation signal J1 according to the sampling signal CLK to obtain the digital accumulation signal L1, and obtain the first position range of the target object according to the digital accumulation signal L1. The signal accumulation module 250 comprises the first level signal sampling unit 2511, the second level signal sampling unit 2512, the first signal accumulation subunit 2520, the n-th signal accumulation subunit 252*n*, wherein n is greater than or equal to 2.

In the embodiment of the invention, if the circuit delay of any adjacent N-level signal sampling unit is less than the sampling period of the sampling signal CLK, then at least one level of signal accumulation subunit is electrically connected between any adjacent signal sampling units. wherein N is greater than or equal to 2.

As shown in FIG. 6, in order to ensure the ranging accuracy, in the above embodiment of setting multi-level signal sampling unit, besides the pulse width of the pulse signal Fn is greater than or equal to twice of the sampling period of the sampling signal CLK, the circuit delay of any two adjacent signal sampling subunits is less than the sampling period of the sampling signal CLK.

Figure 7:
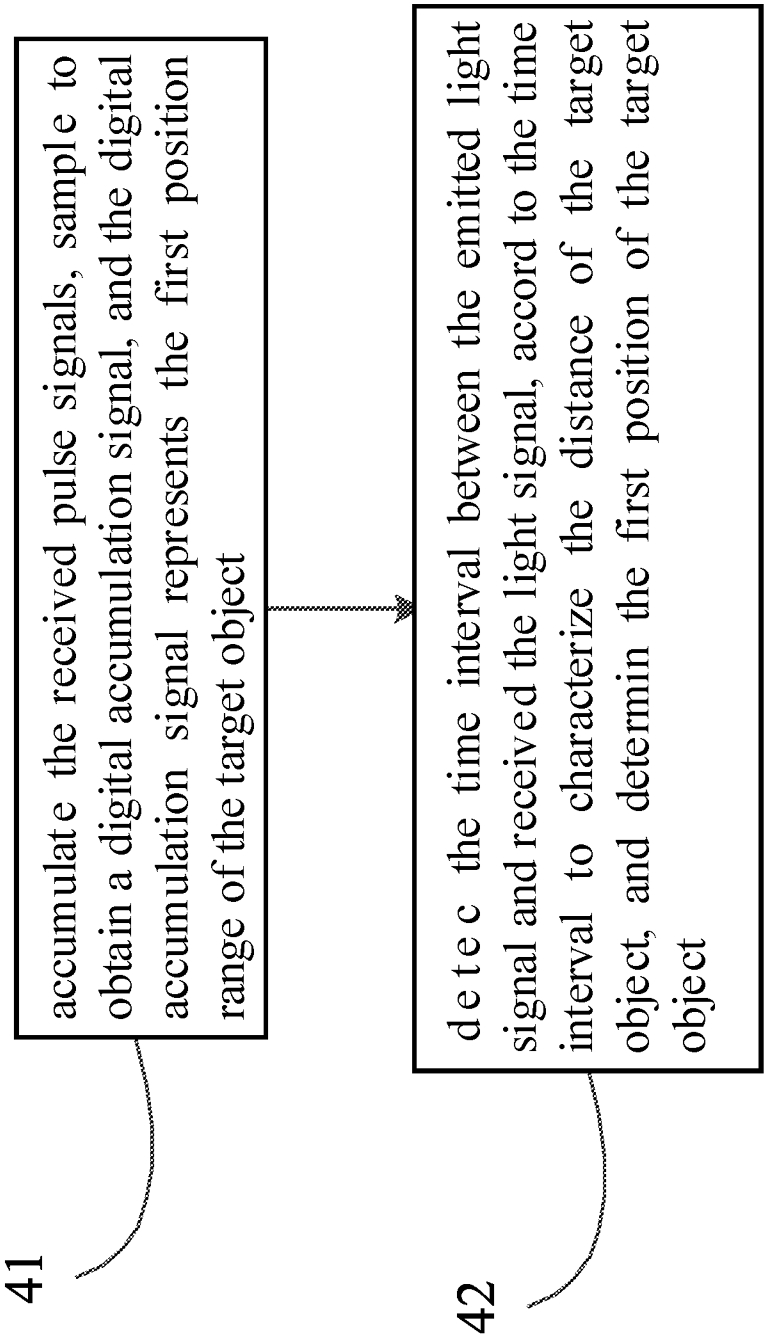
FIG. 7 is the flow diagram of the photoelectric sensing ranging method implemented by the ranging device shown in FIG. 1 according to embodiments of the present invention.

FIG. 7 is the flow diagram of the method implemented by the ranging device 1 shown in FIG. 1 in the embodiment of the invention. As shown in FIG. 7, in the embodiment of the invention, a photoelectric sensing ranging method has the following steps:

Step 41, accumulate the received pulse signals to obtain the accumulation signal, and sample the accumulation signal according to the sampling signal to obtain the digital accumulation signal, which represents the first position range of the target object.

Step 42, timing is performed according to the time interval between the emitted optical signal and the optical receiving module receiving the optical signal, determining the distance of the target object according to the time interval, and determining the first position of the target object within the range of the first position according to the distance of the target object.

Specifically, the optical signal comprises the light reflected from the target object to the photoelectric receiving module after receiving the transmitted optical signal.

In step 41, the step of determining the first position range of the target object according to the time digital signal specifically comprises the following steps:

Step 411. After receiving the optical signal, convert the optical signal into the digital pulse signal.

Step 412: accumulate the received digital pulse signal to obtain the accumulated signal varying with the optical signal intensity.

Step 413, sampling the accumulated signal according to the sampling signal to obtain a first signal intensity distribution diagram, wherein the first signal intensity represents the first position range of the target object.

Step 414, the first position range can be calculated according to the first signal intensity distribution diagram.

Preferably, after the first signal intensity is obtained by sampling the accumulated signal according to the sampling signal, step 415 can be further included:

Repeat step 411, step 412, and step 413 at least once to obtain N signal intensity distribution maps, accumulate the N signal intensity distribution maps and obtain the target signal intensity distribution map, and determine the first position range of the target object according to the target signal intensity distribution map.

When the optical signal is affected by the ambient light or the target object or the interference signal is unstable, the distribution map of the target signal intensity is obtained by repeatedly performing the optical signal sensing and signal processing for many times, and then accumulating the signal intensity obtained each time. When determining the first position range based on this, the interference of the optical signal can be largely eliminated, and the calculation accuracy of the first position range can be improved.

In other embodiments of the invention, if the sampling period of the sampled signal is greater than the delay of the signal accumulation, the signal sampling is performed once after each signal accumulation. That is, at least one level of signal accumulation is performed for the preset number of pulse signals to obtain a target accumulation signal. At least one level of signal sampling is performed for the accumulated pulse signals, and the digital accumulation signals with different signal intensity values are obtained.

Perform N-level signal accumulation and first level signal sampling for the preset number of pulse signals, and N is greater than or equal to 2. The first level signal accumulation in the N-level signal accumulation comprises: i accumulated signals obtained by performing the first signal accumulation for the pulse signals through i signal accumulators, and i is an integer greater than 1. Perform step by step accumulation from the second to the N-th for the i accumulation signals and obtain the target accumulation signal. According to the sampling signal, the target accumulation signal is sampled once and the digital accumulation signal is obtained.

In other embodiments of the invention, N-level signal accumulation and N-level signal sampling are performed for the preset number of the pulse signals. N is greater than or equal to 2. The first level signal accumulation in the N-level signal accumulation comprises:

The first signal accumulation is performed by i signal accumulators for the pulse signals to obtain i accumulated signals, whereas i is an integer greater than 1;

Performing a second to N-th step by step signal accumulation for the i accumulation signals;

After accumulating each level of signals according to the sampling signal, a signal sampling is performed until the digital accumulation signal is obtained.

Performing signal sampling on the pulse signals according to the sampling signals and transmitting them to the i signal accumulators; and The i signal accumulators perform the first signal accumulation for the pulse signals and obtain i accumulation signals, and i accumulation signals perform the second to the N-th step by step signal accumulation and signal sampling and obtain the digital accumulation signals.

In other embodiments of the invention, N-level signal accumulation is performed for the preset number of pulse signals, and N is greater than or equal to 2. If the delay of signal sampling of any two adjacent levels is less than the sampling period of the sampling signal, the signal accumulation is performed at least once between any two adjacent signal samples.

In an embodiment of the invention, the first level signal accumulation in the N-level signal accumulation comprises:

The first signal accumulation is performed by i signal accumulators for the pulse signals to obtain i accumulated signals, wherein i is an integer greater than 1; and Performing a second to N-th step by step signal accumulation for the i accumulation signals; When performing signal sampling according to the sampling signal for the pulse signal after the signal accumulation of each level, if the circuit delay of the signal sampling of any two adjacent levels is less than the sampling period of the sampling signal, at least one level of the signal accumulation is performed between any two adjacent signal samples.

The pulse width of the pulse signal is greater than or equal to the sampling period of the sampling signal CLK.

Figure 8:
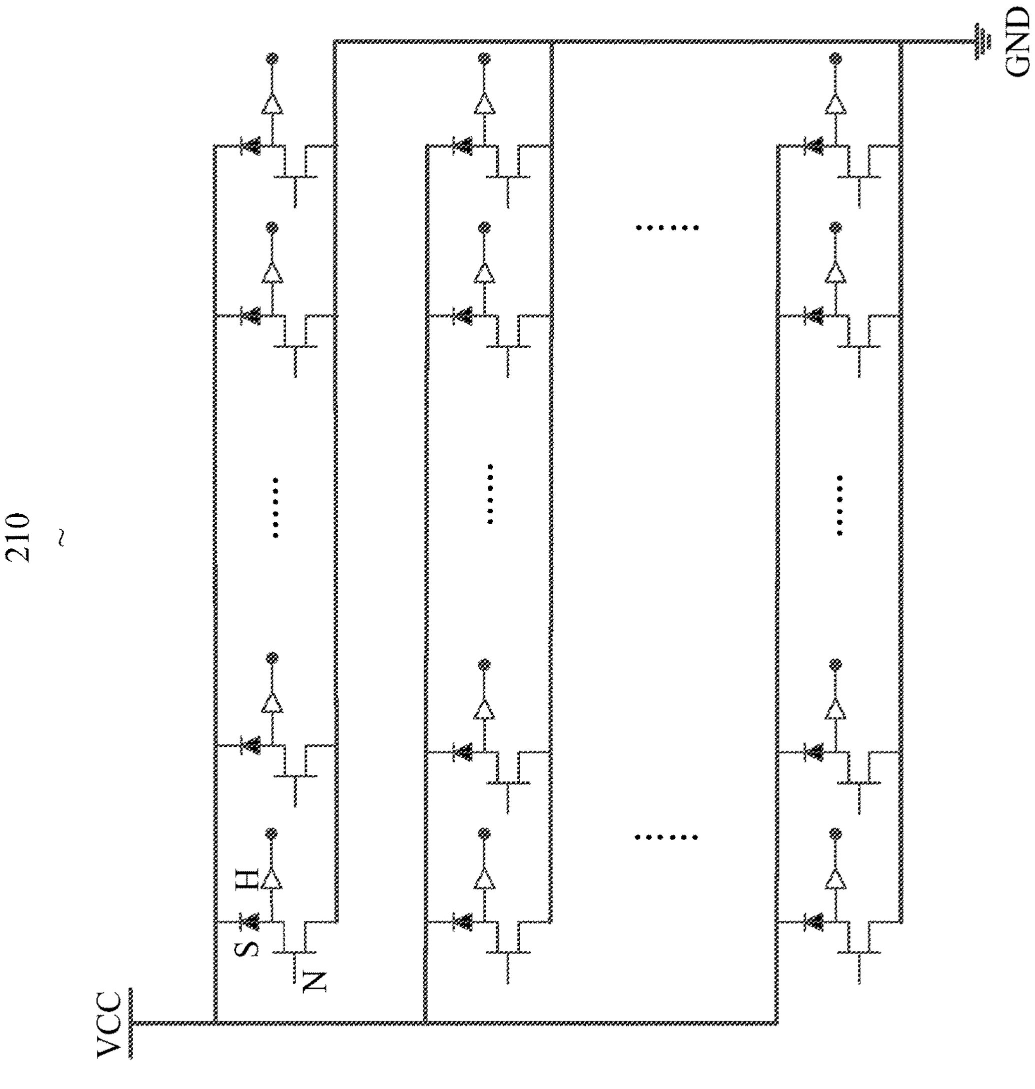
FIG. 8 is the circuit diagram of the photoelectric receiving module in the structure diagram of FIG. 3 according to embodiments of the present invention.

Refer to FIG. 8, which is the circuit block diagram of the photoelectric receiving module 210 shown in FIG. 3 in the embodiment of the present invention. As shown in FIG. 8, the photoelectric receiving module 210 is a silicon photomultiplier tube. The silicon photomultiplier is used to convert the received optical signal into a digital electrical signal, and the optical signal is the signal reflected by the target object. Specifically, the silicon photomultiplier tube is electrically connected between the drive voltage terminal VCC and the ground terminal GND. The silicon photomultiplier tube comprises at least one photon detector S, at least one transistor N, and at least one buffer H. wherein, the photon detector S is electrically connected between the drive power terminal VCC and the source of transistor N, the drain of transistor N is electrically connected to the ground terminal GND, and the buffer H is electrically connected between the source of transistor N and the pulse conversion module 220.

In this embodiment, all photon detectors S in the photoelectric receiving module 210 are connected in parallel with each other. When receiving the optical signal, each photon detector S can convert the optical signal into a pulse signal and input it into the pulse conversion module 220.

Figure 9:
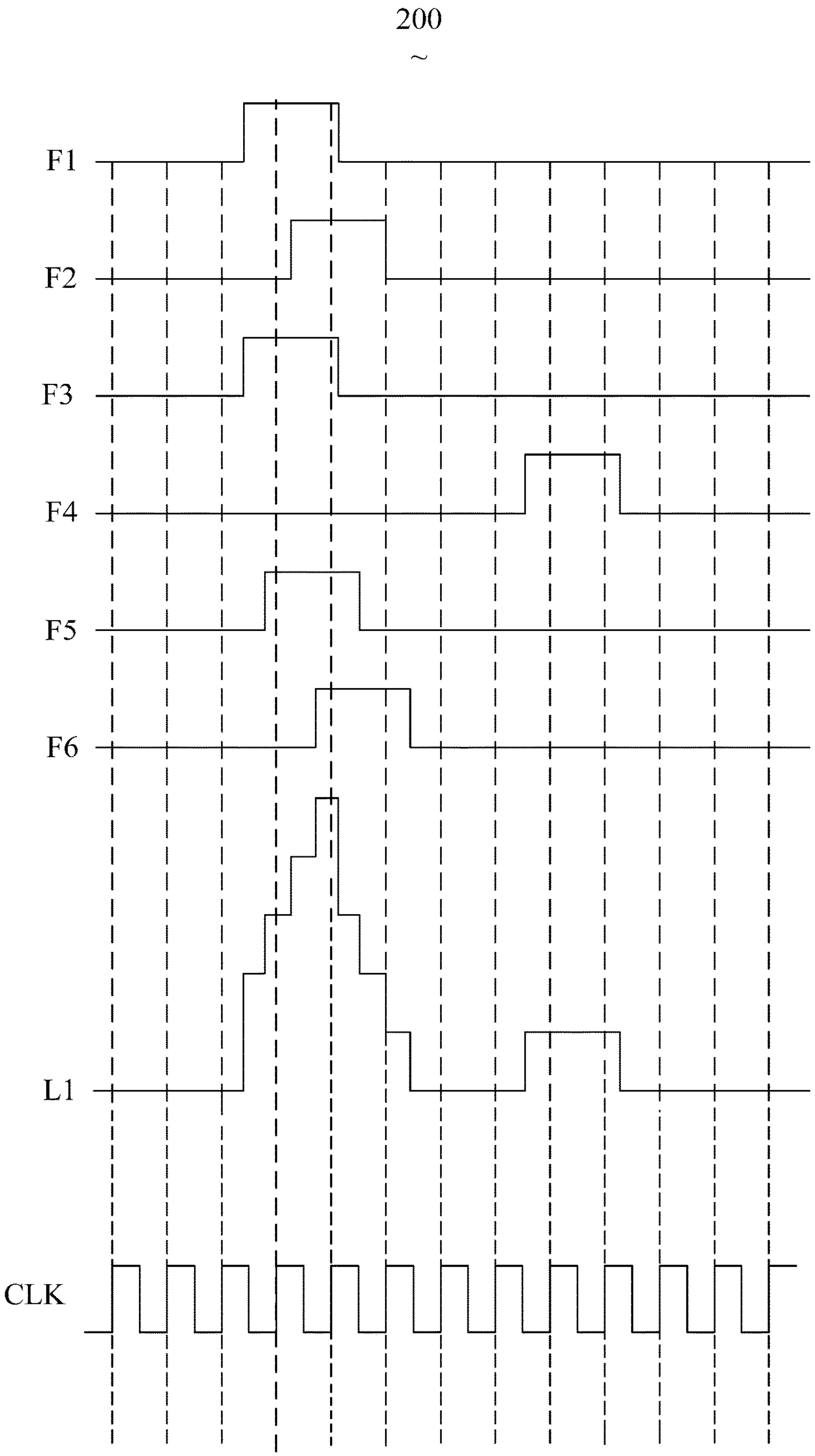
FIG. 9 is a pulse signal accumulation sequence diagram according to embodiments of the present invention.

Refer to FIG. 9, which is the pulse signal accumulation timing chart in the embodiment of the invention. As shown in FIG. 9, F1 represents the first pulse signal, F2 represents the second pulse signal, F3 represents the third pulse signal, F4 represents the fourth pulse signal, F5 represents the fifth pulse signal, F6 represents the sixth pulse signal, L1 represents the digital accumulation signal of the above six pulse signals, photoelectric sensing acquisition module 20 represents the pulse signal accumulation sequence diagram at a certain time, and CLK represents the sampling signal. Specifically, in order to more accurately obtain the accumulated sampling signal value and calculate the target object's preparation distance, the pulse width of the pulse signal Fn is greater than or equal to twice of the pulse width of the sampling signal CLK sampling period.

The signal accumulation module 230 accumulates the pulse signal Fn received at the same time. When the photoelectric sensor acquisition module 20 continuously receives the optical signal, it obtains the accumulation signal J1 that changes with the signal intensity. Then it uses the sampling signal CLK to sample the accumulation signal J1, and obtains the digital accumulation signal L1 signal intensity distribution diagram that changes with the signal intensity. The digital accumulation signal L1 is a discrete signal.

In the embodiment of the invention, the valid pulse signal is recorded as the number 1, and the invalid pulse signal is recorded as the number 0. In the same sampling period, the pulse signals Fn of different levels are accumulated to obtain the accumulated signal J1. In the embodiment, the signal intensity value of the accumulation signal J1 comprises 0, 1, 2, 3, 4, and 5. After the sampling signal CLK sample to obtain the digital accumulation signal L1, the maximum signal intensity value of the digital accumulation signal L1 is 5, the minimum signal intensity value is 0, and the corresponding time when the analysis signal intensity value is 5, the data processing module 10 can obtain the distance of the target object 40.

In the embodiment of the invention, the pulse signal Fn accumulation and sampling process and principle in other time periods are the same as those described in FIG. 3, and will not be repeated here.

In other embodiments of the invention, the number of pulse signals Fn is not limited to 6, and can be n pulse signals, wherein n is a positive integer greater than or equal to 1.

Figure 10:
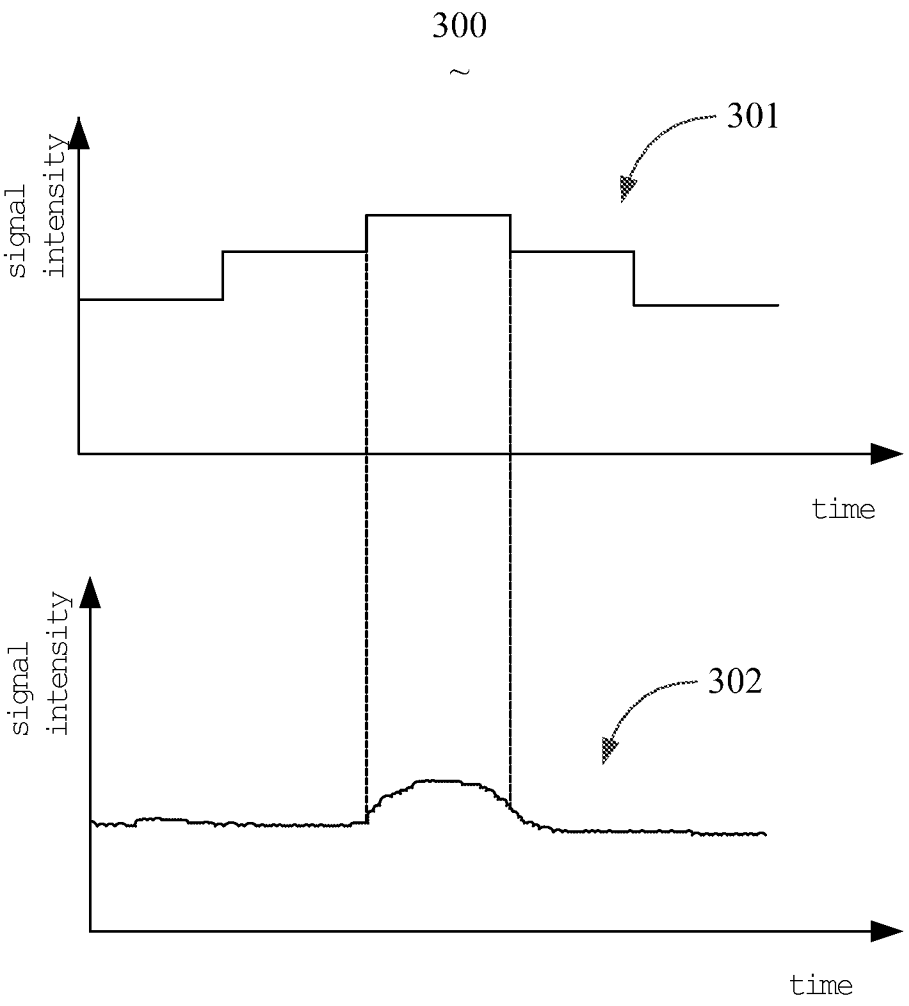
FIG. 10 is the target signal intensity distribution diagram output by the photoelectric sensor acquisition module shown in FIG. 3 according to embodiments of the present invention.

Please refer to FIG. 10, which is the target signal intensity distribution diagram output by the photoelectric sensor acquisition module 20 shown in FIG. 3 in the embodiment of the invention. the photoelectric sensor acquisition module 20 outputs the target signal intensity distribution diagram 300 of the target object. Target signal intensity distribution diagram 300 comprises cumulative signal intensity distribution diagram 301 and temporal digital signal distribution diagram 302. Specifically, cumulative signal intensity distribution diagram 301 and temporal digital signal distribution diagram 302 are discrete signals.

In this embodiment, the signal-to-noise ratio of the data collected by the signal accumulation module 230 is high, which can better identify the precise position of the target object. However, for the time to digital conversion module 250, the signal-to-noise ratio of the data collected is low, which makes it difficult to accurately obtain the precise position of the target object. Therefore, the distance of the target object will be calculated using the data collected by the signal accumulation module 230.

Figure 11:
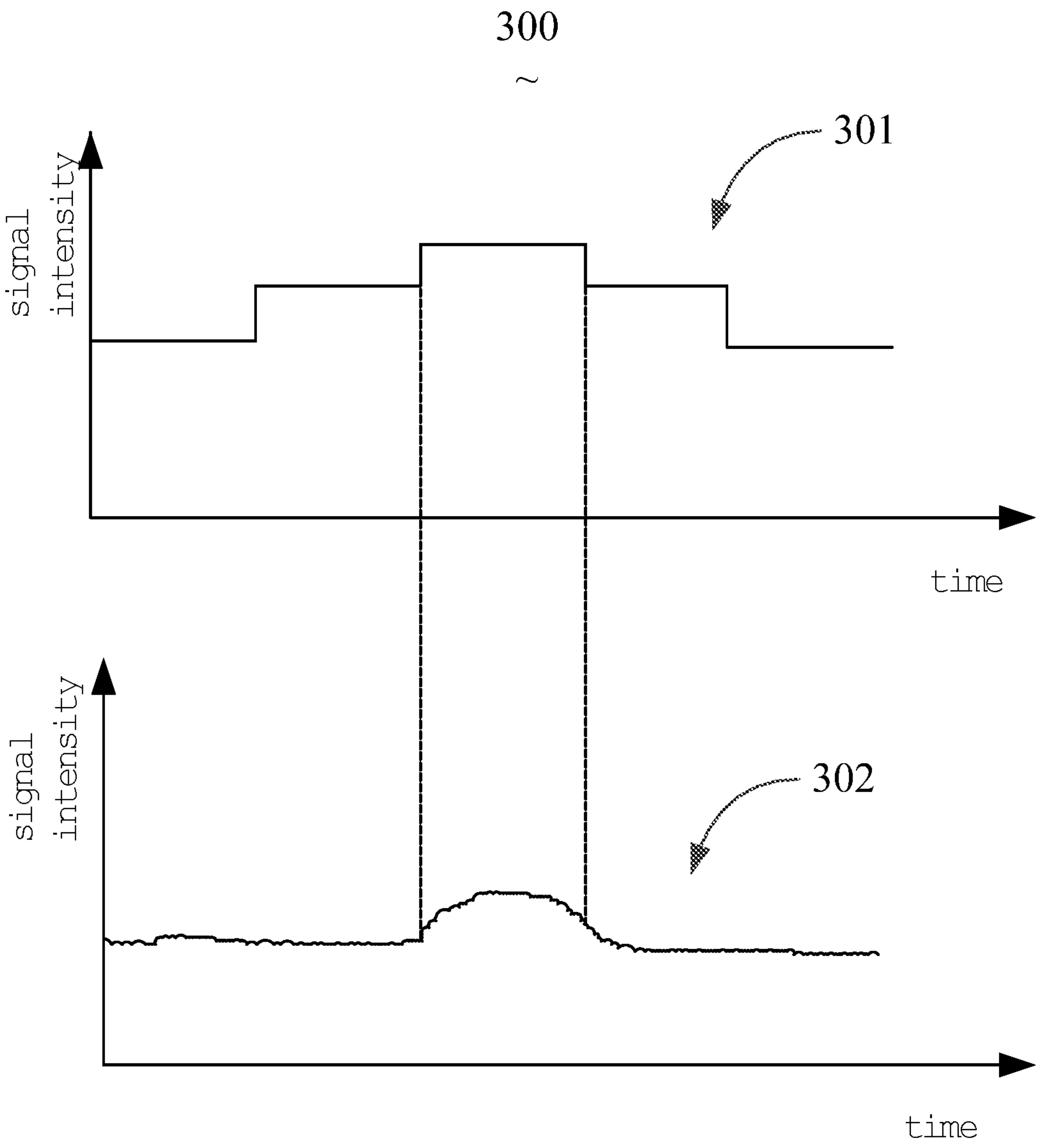
FIG. 11 is the target signal intensity distribution diagram output by the photoelectric sensor acquisition module shown in FIG. 3 according to embodiments of the present invention.

Refer to FIG. 11, which is the target signal intensity distribution diagram output by the photoelectric sensor acquisition module 20 shown in FIG. 3 in another embodiment of the invention. The data processing module 10 determines the first position range of the target object based on the digital accumulation signal from the photoelectric sensor acquisition module 20, and determines the first position of the target object based on the time digital signal.

The photoelectric sensor acquisition module 20 outputs the target signal intensity distribution diagram 400 of the target object. Target signal intensity distribution diagram 400 comprises cumulative signal intensity distribution diagram 401 and temporal digital signal distribution diagram 402. Specifically, cumulative signal intensity distribution diagram 401 and temporal digital signal distribution diagram 402 are discrete signals.

Both the signal accumulation module 230 and the time digital conversion module 250 can collect signal data with high signal-to-noise ratio. First, calculate the first position range of the target object according to the cumulative signal intensity distribution diagram 401, and then collect the corresponding signal data area on the time digital signal distribution diagram 402 according to the first position range of the target object, so as to accurately determine the first position of the target object. That is, according to the distribution range of the maximum signal intensity in the cumulative signal intensity distribution diagram 401, locate the transmission time $\Delta t$ of the optical signal with the maximum signal intensity in the time digital signal distribution diagram 402. Then calculate the first position with the target object.

In the embodiment of the invention, the photoelectric receiving module 210 converts the received optical signal into a pulse signal Fn, and the pulse conversion module 220 adjusts the pulse width of the received pulse signal Fn to between 1 ns-10 ns. After that, the signal accumulation module 230 accumulates the pulse signal Fn, and finally accumulates all the pulse signals Fn to the last signal accumulation module, and the signal sampling unit samples the accumulated signal J1 output by the last accumulation, In the process of receiving optical signals continuously by the photoelectric receiving module 210, the signal sampling unit will output a discrete cumulative signal intensity distribution map according to the different distance and reflectivity of the target object.

When the photoelectric receiving module 210 outputs the pulse signal Fn, if the OR-gate module 240 does not receive the pulse signal Fn, it will not output the pulse signal to the time digital conversion module 250. If the output pulse signal Fn comprises at least one pulse signal, it will output the pulse signal to the time digital conversion module 250. In the process that the photoelectric receiving module 210 continuously outputs the pulse signal Fn, the time digital conversion module 250 outputs the discrete time digital signal distribution diagram according to the received pulse signals of different levels.

The photoelectric sensor acquisition module 20 disclosed in the embodiment of the invention can accurately measure the distance of the target, with low cost and high reliability of ranging data.

A photoelectric sensor acquisition module disclosed in the embodiment of the invention is described in detail above. In this paper, specific examples are used to illustrate the principle and implementation mode of the invention. The above description of the embodiment is only used to help understand the method and core idea of the invention; At the same time, for ordinary technicians in the field, according to the idea of the invention, there will be changes in the specific implementation mode and scope of invention. To sum up, the content of the specification should not be interpreted as a restriction on the invention.

This diagram is merely an example, which should not unduly limit the scope of the claims. One of ordinary skill in the art would recognize many variations, alternatives, and modifications.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. An apparatus for range determination, the apparatus comprising:

- a signal transmitter configured to emit an optical signal at a first time;
- a first light transmitting unit configured to direct the optical signal to a target;
- a second light transmitting unit configured to receive a reflected optical signal at a second time, the reflected optical signal being associated with the optical signal and the target;
- a first photoelectric receiver configured to convert a first portion of the reflected optical signal to a first electrical signal;
- a first pulse converter configured to generate a first pulse using the first electrical signal;
- a first time to digital converter (TDC) configured to generate a first TDC output using at least the first electrical signal;
- a first signal accumulator configured to generate a first accumulator output using the at least first electrical signal, wherein the first signal accumulator comprises a digital accumulator and a sampler, the digital accumulator is configured to accumulate a pulse signal after adjustment of a pulse width by the first pulse converter to obtain an accumulation signal, and the sampler is configured to sample the accumulation signal according to a sampling signal to obtain a digital accumulation signal, and the digital accumulation signal represents a first position range of the target; and a data processor configured to calculate a difference between the first time and the second time using the first TDC output and/or the first accumulator output.

2. The apparatus of claim 1 wherein the optical signal comprises a laser pulse.

3. The apparatus of claim 1 wherein the first photoelectric receiver comprises a plurality of single photon avalanche diodes (SPADs).

4. The apparatus of claim 3 wherein the first TDC is configured to generate a histogram using outputs of the plurality of SPADs.

5. The apparatus of claim 4 wherein the plurality of SPADs are coupled one or more OR gates.

6. The apparatus of claim 3 wherein the first signal accumulator is coupled to outputs of the plurality of SPADs.

7. The apparatus of claim 6 wherein the outputs of the SPADs are coupled to a first accumulator subunit at a first level.

8. The apparatus of claim 7 wherein the first accumulator subunit is coupled to a second accumulator subunit at a second level.

9. The apparatus of claim 1 wherein the first photoelectric receiver comprises one or more silicon photomultipliers.

10. The apparatus of claim 1 further comprising a plurality of photoelectric sensing acquisition modules, the plurality of photoelectric sensing acquisition modules comprising a first photoelectric sensing acquisition module, the first photoelectric sensing acquisition module comprises the first photoelectric receiver and the first pulse converter.

11. A photoelectric sensor acquisition module, comprising:

a photoelectric receiving module comprising a plurality of photoelectric sensing units arranged in a matrix, the photoelectric sensing units being configured to convert an received optical signal into a digital pulse signal, wherein the received optical signal comprises a light reflected from an target object to the photoelectric receiving module;

a signal accumulation module electrically connected to the photoelectric receiving module, the signal accumulation module being configured to accumulate the digital pulse signal to obtain an accumulation signal and to sample the accumulation signal according to a sampling signal to obtain a digital accumulation signal, the digital accumulation signal representing the first position range of the target object; and a pulse conversion module coupled to the photoelectric receiving module through the pulse conversion module, the pulse conversion module being configured to adjust a pulse width of the digital pulse signal received from the photoelectric receiving module, wherein the signal accumulation module accumulates the pulse signal after adjusting the pulse width and obtains the accumulation signal.

12. The module of claim 11 further comprising:

a time digital conversion module electrically coupled to the signal output terminal, the time digital conversion module being configured to measure a time interval between a light signal emitted by the signal transmitting module and the light signal received by the photoelectric receiving module, the time digital conversion module being further configured to obtain a time digital signal according to the time interval characterizing a distance of the target object, the time digital conversion module further configured to determine the first position of the target object within the first position range according to the distance of the target object; and an OR-gate module electrically coupled to the pulse conversion module and the time digital conversion module being configured to transmit a converted pulse signal to the time digital conversion module when any photoelectric sensing unit of the photoelectric receiving module receives the optical signal.

13. The module according to claim 12, wherein:

the OR-gate module comprises at least a first level OR-gate subunit;

the first level OR-gate subunit comprises a plurality of OR-gate input terminals and an OR-gate output terminal;

a total number of the first level OR-gate input terminals is the same as a number of the photoelectric sensing units;

the first level OR-gate input terminal is electrically connected to at least one pulse conversion module; and the OR-gate output terminal is coupled to the time digital conversion module.

14. A photoelectric sensing ranging method, comprising:

accumulating a received pulse signals to obtain an accumulation signal;

sampling the accumulation signal according to the sampling signal to obtain a digital accumulation signal, the digital accumulation signal being associated with a first position range of a target object;

detecting a time interval between an emitted light signal and the photoelectric receiving module receiving a light signal;

obtaining a time digital signal according to the time interval to characterize the distance of the target object; and determining a first position of the target object within the first position range according to the distance of the target object.

15. The method of claim 14 wherein the first position range for determining the target object according to the digital accumulation signal comprises:

converting an optical signal to a received pulse signal;

accumulating the received digital pulse signals to obtain accumulating signals varying with the intensity of the optical signals;

sampling the accumulated signal to obtain a first histogram; and analyzing the first histogram to determine the first position range.

16. The method of claim 15 further comprises:

receiving optical signals repeatedly;

converting the optical signals into digital pulse signals;

accumulating the received digital pulse signals to obtain the accumulating signal varying with the intensity of the optical signals;

sampling the accumulated signal according to the sampling signal to obtain N signal intensity distribution diagrams;

accumulating the N signal intensity distribution diagrams and obtaining the target signal intensity distribution diagram; and analyzing the target signal intensity distribution diagram to determine the first position range.

17. The method of claim 16 further comprises performing at least one level of signal accumulation for the preset number of pulse signals to obtain a target accumulation signal, wherein at least one level of signal sampling is performed for the accumulated pulse signal, and the digital accumulation signals with different signal intensity values are obtained.

* * * * *